US007356914B2

(12) United States Patent
Keswani et al.

(10) Patent No.: US 7,356,914 B2
(45) Date of Patent: Apr. 15, 2008

(54) TWIST-ON WIRE CONNECTOR APPLICATOR

(75) Inventors: Sushil Keswani, Sycamore, IL (US); Gary Bethurum, Murrieta, CA (US)

(73) Assignee: IDEAL Industries, Inc., Sycamore, IL (US)

( * ) Notice: Subject to any disclaimer, the term of this patent is extended or adjusted under 35 U.S.C. 154(b) by 401 days.

(21) Appl. No.: 10/982,133

(22) Filed: Nov. 4, 2004

(65) Prior Publication Data

US 2005/0139375 A1 Jun. 30, 2005

Related U.S. Application Data

(60) Provisional application No. 60/517,168, filed on Nov. 4, 2003.

(51) Int. Cl.
*B23P 19/00* (2006.01)
*H01R 43/00* (2006.01)

(52) U.S. Cl. ............................ 29/748; 29/747; 29/758

(58) Field of Classification Search .................. 29/706, 29/722, 729, 731, 747, 750, 756, 758, 854, 29/857, 874; 81/121.1, 124.2; 174/87, 84 S; 439/590, 877, 879
See application file for complete search history.

(56) References Cited

U.S. PATENT DOCUMENTS 3,016,774 A 1/1962 Minobe
3,068,485 A 12/1962 Lingle et al.
3,653,117 A 4/1972 Wolfberg et al.
3,739,448 A 6/1973 Garner
3,787,948 A * 1/1974 Runge ........................ 81/121.1
3,887,981 A * 6/1975 Mazzeo et al. ............... 29/750
3,988,102 A 10/1976 Bakermans et al.
4,236,302 A 12/1980 Kuehling
4,318,215 A 3/1982 Holt
4,348,806 A 9/1982 Eves et al.
4,360,969 A 11/1982 Collier
4,365,527 A 12/1982 Kruse
4,467,516 A 8/1984 John et al.
4,489,589 A 12/1984 Kirsinas et al.
4,531,283 A 7/1985 Kitchens et al.
4,534,107 A 8/1985 Maack
4,575,932 A 3/1986 Joos et al.
4,642,874 A 2/1987 Litehizer, Jr.
4,784,669 A 11/1988 Maack
4,823,650 A * 4/1989 Tuttle ........................ 81/124.2
4,890,474 A 1/1990 Agostini et al.
4,924,035 A 5/1990 Miller et al.
5,054,191 A 10/1991 Schule
5,379,809 A * 1/1995 Waulk ........................ 140/118
5,509,194 A 4/1996 Hornung et al.
5,557,070 A 9/1996 Tamm
5,687,613 A * 11/1997 Swedberg .................... 29/753
5,784,935 A * 7/1998 Korinek ....................... 81/467
5,842,268 A 12/1998 Arnfield (Continued)

*Primary Examiner*—Donghai D. Nguyen
(74) *Attorney, Agent, or Firm*—Cook, Alex, McFarron, Manzo, Cummings & Mehler, Ltd.

(57) ABSTRACT

A wire connector applicator is capable of holding a clip of interconnected twist-on wire connectors in a tube which can be rotated by an electric motor. The connectors rotate with the tube for installation on the ends of stripped electrical wires. The invention is also directed to an interlocking twist-on wire connector which prevents axial separation and relative rotation of similarly configured group or clip of interlocked connectors.

29 Claims, 5 Drawing Sheets

U.S. PATENT DOCUMENTS

| | | | | |
|---|---|---|---|---|
| 5,954,539 | A | 9/1999 | Hornung | |
| 6,067,707 | A | 5/2000 | Cluggish | |
| 6,145,192 | A | 11/2000 | Moyaert et al. | |
| 6,256,871 | B1 | 7/2001 | Bunnell et al. | |
| 6,317,970 | B1 | 11/2001 | Leistner et al. | |
| 6,922,887 | B1 * | 8/2005 | Keswani | 29/757 |
| 7,231,710 | B2 * | 6/2007 | Boa et al. | 29/748 |

* cited by examiner

TWIST-ON WIRE CONNECTOR APPLICATOR

CROSS-REFERENCE TO RELATED APPLICATION

This application claims the benefit of U.S. Provisional Application No. 60/517,168, filed on Nov. 4, 2003, which is hereby incorporated by reference.

BACKGROUND OF THE INVENTION

This invention is directed to an apparatus for installing twist-on wire connectors onto the ends of stripped electrical wires. The invention also concerns a twist-on wire connector whose shape has been optimized for use with the applicator of the present invention.

Twist-on or screw-on wire connectors have been used for many years to provide a simple and efficient means of mechanically and electrically joining stripped ends of two or more electrical wires. Such connectors typically have a frusto-conical housing or shell with a metallic spring disposed in the interior of the shell. The process of installing one of these twist-on wire connectors usually includes the step of first stripping the insulation off the ends of a number of wires. Next, the twist-on wire connector is placed onto the stripped ends of the wires. Once the connector is in place, it is rotated or twisted, typically by hand, until the wires are joined together. As a result of this process the electrical wires are electrically and mechanically joined, with the outer insulating shell of the connector providing protection for the stripped wire ends.

Many twist-on wire connectors include opposing, outwardly-extending wings or fins to provide a comfortable and accessible surface to facilitate twisting by hand. However, applying large numbers of these connectors by hand can lead to fatigue or repetitive stress injuries. Furthermore, the several steps involved in terminating or connecting wires makes the process slow and inefficient where numerous connections need to be made.

Devices have been made to address the need for repetitive twisting motion. These devices, which may be referred to as “twist assist” devices, have a conically shaped cup which receives the wire connecter's shell. At the other end of the twist assist device there is an axially-extending shaft, which is inserted into a driver of some sort. The driver can be either a hand-operated tool or a powered drill or screw-driver. While these twist assist devices address the problem of repetitive motion injury, the many steps still required to apply connectors keep the process relatively slow and in need of improvement in production situations where large numbers of connectors have to be applied.

Other devises are also known for attaching twist-on connectors. One such apparatus is shown in U.S. Pat. No. 3,016,774 to Minobe, the disclosure of which is herein incorporated by reference. It includes a receptacle or hopper for holding a large number of twist-on connectors. The connectors are serially fed from the hopper through a tube or semi-flexible hose to the hand-operated applicator. A switch initiates the rotating motion to apply the connector onto the stripped ends of the wires. Devices of this type are typically used at a fixed workstation in an assembly line operation.

While this type of apparatus addresses repetitive stress problems and helps to speed up the process of applying connectors by automatically feeding a new connector to the applicator, these devices are bulky and not easily transportable. In addition, these devices cannot assist tradespeople who quickly move from one location to another. While the twist assist drivers mentioned above are fully portable, they operate on only one connector at a time. What is still needed in the art is a device, which combines the advantages of serially feeding connectors and with the portability of hand-held twist assist drill/drivers.

SUMMARY OF THE INVENTION

The present invention is an applicator which automatically feeds and installs twist-on wire connectors. The applicator is lightweight, compact, and portable. In one embodiment, the housing of the device is preferably gun-shaped with an elongated barrel portion, a handle portion and a central case between the barrel and the handle. Within the elongated barrel is a rotatable tube with an opening at one end for receiving a plurality of wire connectors. These connectors are preferably disengagably interlocked wing-type twist-on wire connectors. A spring is disposed in the tube and is compressed when a clip of interlocked wire connectors is fed into the tube. The spring urges the connectors toward the opening of the tube.

A retaining cap attached to or integral with the barrel is positioned adjacent the opening of the tube and prevents the clip of connectors from prematurely exiting before the connector has been applied to the stripped ends of the wires. Bearings surround a portion of the tube to mount it for rotation within the barrel.

The device further includes an electric motor disposed in the case portion of the housing for rotating the tube. Preferably the motor is connected to a variable speed controller and a planetary gear assembly to provide for variable speed and torque. The motor is powered by a standard power drill/driver rechargeable battery pack, a portion of which is disposed in the handle portion of the housing. The device further includes an easily accessible switch for activating and deactivating the motor and preferably a switch for the user to set the operating speed of the motor.

The tube includes at least one protrusion extending radially inwardly from the inside wall of the tube. As the electric motor rotates the tube, the protrusion contacts the wing or other radially extending rib of a wire connector causing it to rotate.

The invention is also directed to twist-on wire connectors, preferably detachably interlocking wing-type connectors. In one embodiment, the wire connector has opposing wings that extend radially outwardly from the outer surface of the wire connector preferably adjacent the open end of the shell. The outer surface of the wire connector also includes at least one projecting member which extends radially outwardly from the outer surface and is preferably positioned near the closed end of the shell. The interior surface preferably near the open end of the shell also includes at least one slot. The outer projecting member is adapted to engage the slot.

In another embodiment, the wire connector has opposing wings that extend radially outwardly from the outer surface of the wire connector preferably adjacent the open end of the shell. The outer surface of the wire connector also includes at least one rib or thread, preferably a circumferential rib or thread, and at least one projecting member both of which extend radially outwardly from the outer surface and are preferably positioned near the closed end of the shell. The interior surface preferably near the open end of the shell also includes at least one groove or thread, preferably a circumferential groove or thread, and at least one slot.

The outer circumferential rib or thread and the outer projecting member are adapted to engage the inner groove or thread, or slot respectively.

DETAILED DESCRIPTION OF THE INVENTION

Figure 1:
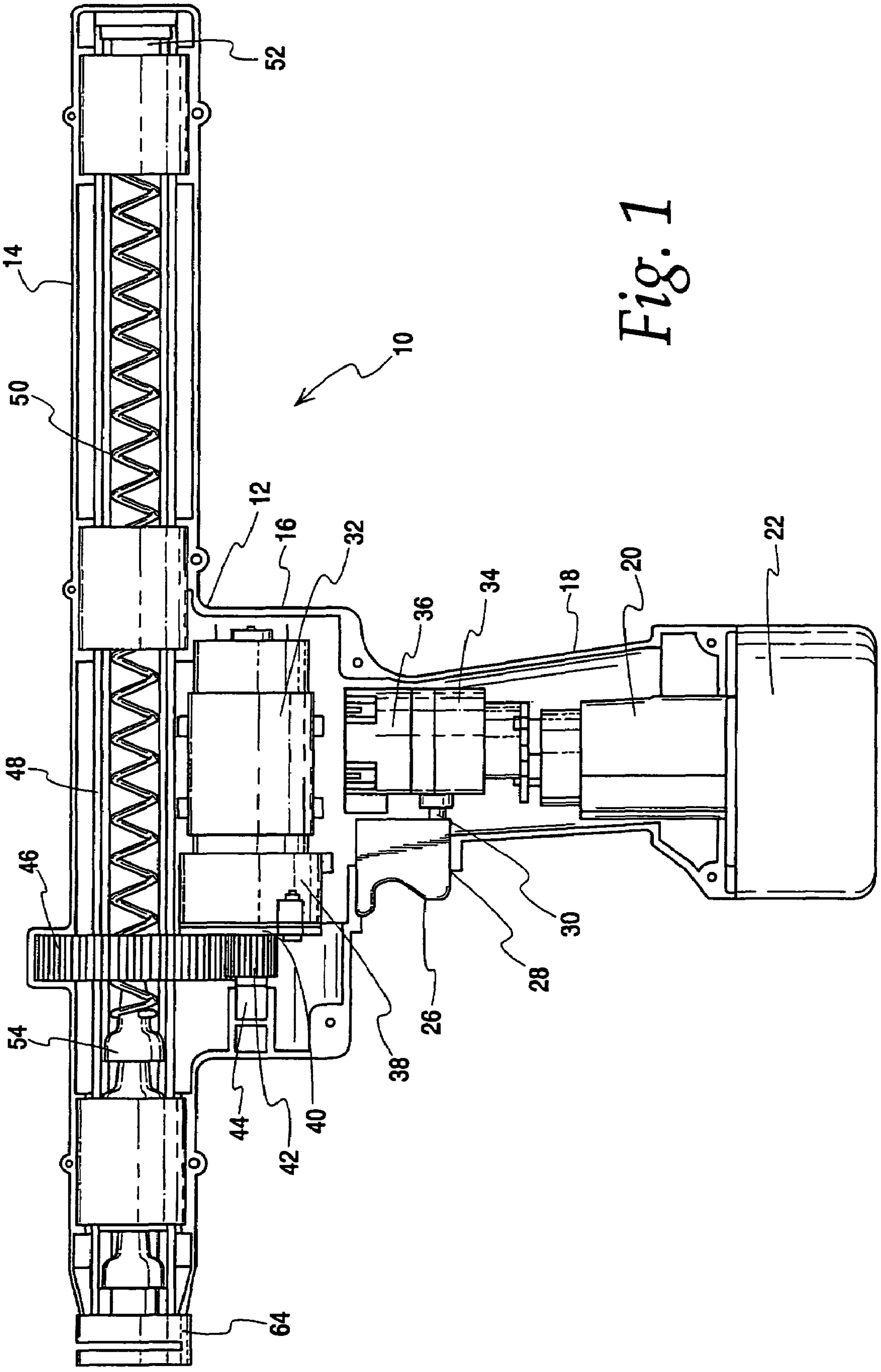
FIG. 1 is a diagrammatic sectional view of a preferred embodiment of the wire connector applicator of the present invention.
Figure 2:
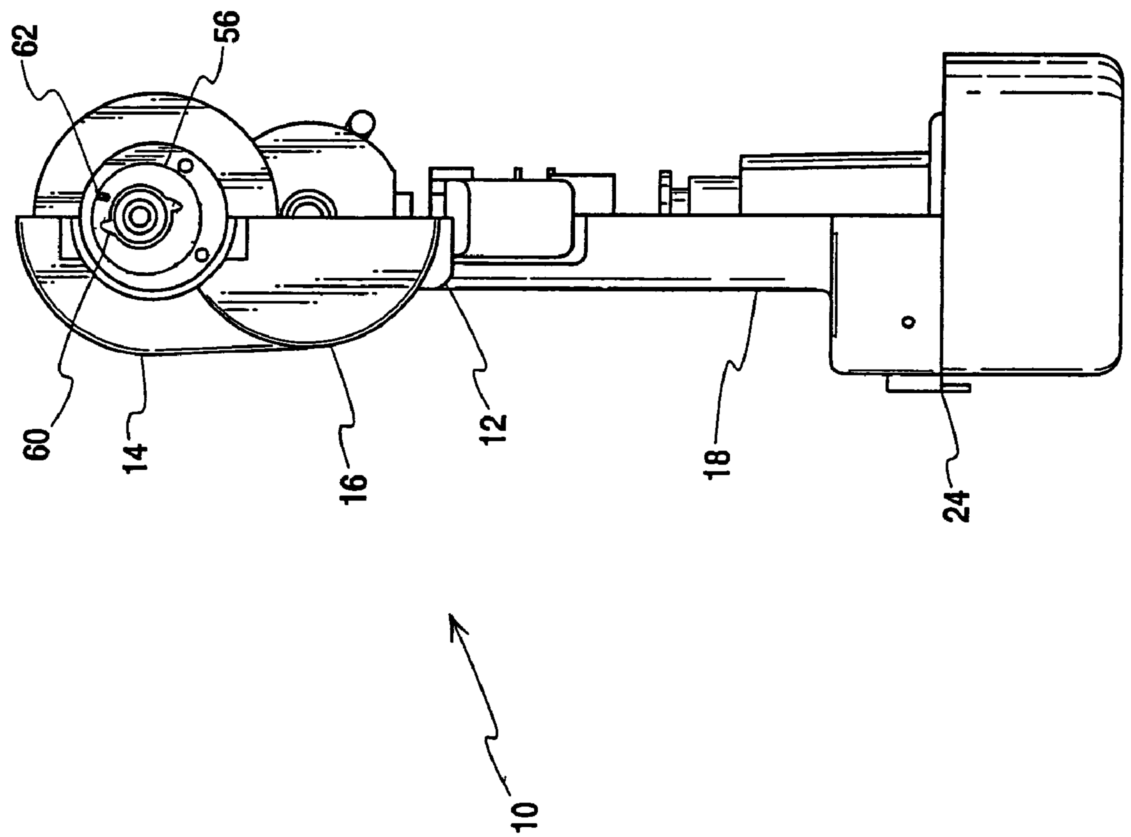
FIG. 2 is a front elevation view of the applicator with the right half of the housing removed to expose the interior components.
Figure 3:
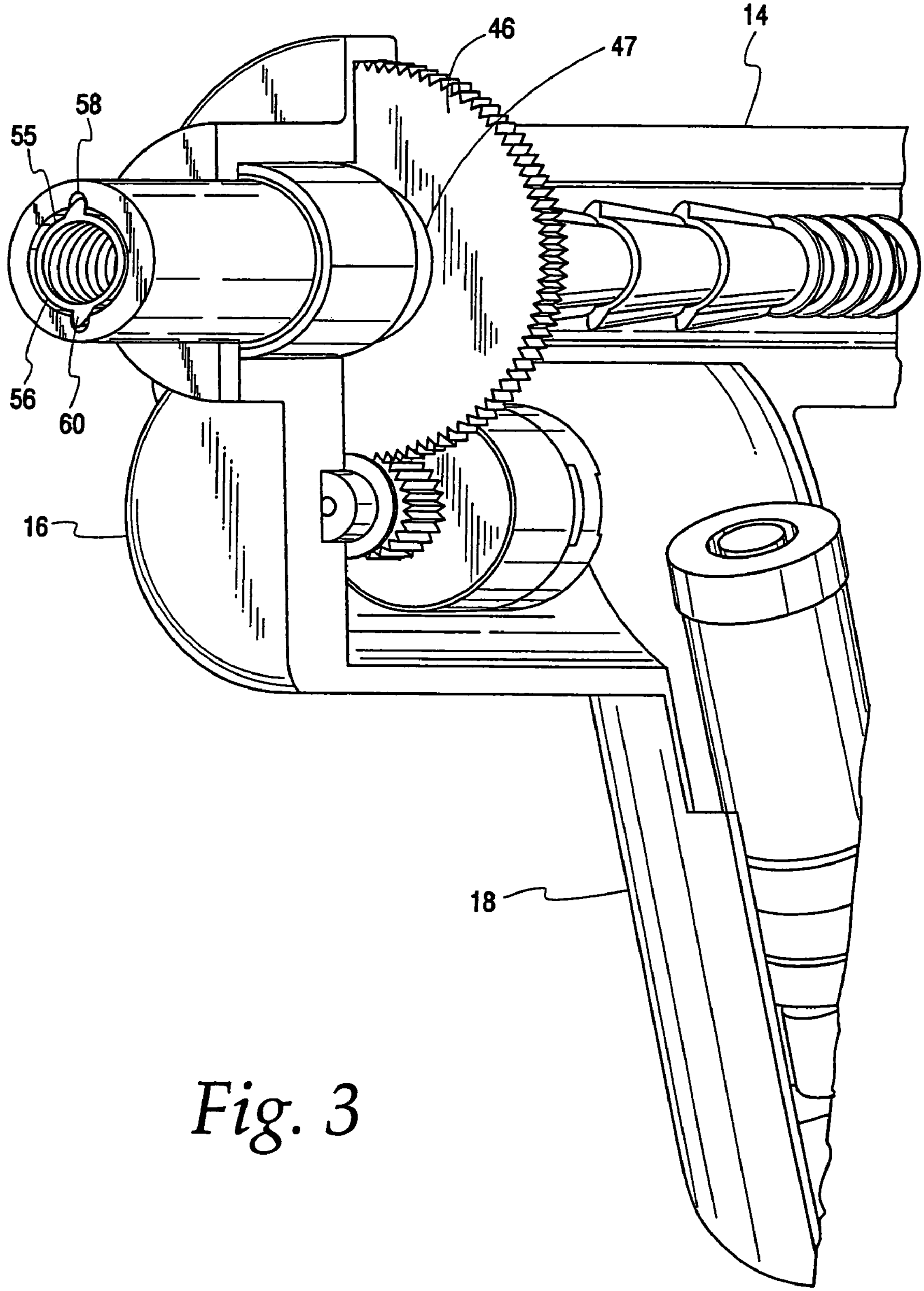
FIG. 3 is a perspective view of the applicator with portions of the housing removed and showing an alternate configuration of the reservoir tube interior.

A wire connector applicator 10 according to the present invention is shown in FIGS. 1-3. Its housing 12 has an appearance generally resembling a standard power drill/driver. The applicator 10 has an elongated barrel 14 which is preferably made of a hard, durable plastic. Extending at about a right angle and slightly off center of the barrel 14 is a handle 18. A central case 16 is disposed between the handle and the barrel. At the lower most end of the handle 18 is an opening to accept a portion 20 of a standard rechargeable battery pack 22. The battery pack is retained by clips 24 (FIG. 2). A trigger 26 extends through an opening 28 in the handle and is biased to extend out from the handle. The trigger is positioned to be accessible by a user's index finger such that the trigger can be squeezed towards the housing to activate a switch 30 for controlling power to an electric motor 32. The electrical circuit between the electric motor, switch and the battery is provided through a switch connector 34 which is disposed in the handle portion of the housing.

Additionally, a variable speed controller 36 is positioned above the switch connector 34. It is included in the electrical circuit to allow the user to vary the speed of the motor and thereby control the rotation speed applied to the wire connector. A planetary gear assembly 38 is connected to the electric motor 32. Both the motor 32 and planetary gear assembly 38 are contained within the case portion 16 of the housing. Extending axially out from the planetary gear assembly is a driveshaft 40. A pinion 42 is mounted on the end of the driveshaft. The driveshaft terminates at a bearing 44 which is mounted in the case to support the driveshaft. A ring gear 46 engages the pinion. A central opening 47 (FIG. 3) in the ring gear receives an elongated connector reservoir tube 48 which is not required to be cylindrically shaped. The tube 48 may or may not extend the entire length of the barrel. The ring gear 46 can be either a separate part attached to the tube 48 or it can be integrally formed therewith. In either case, when the pinion 42 is driven by the motor 32, it causes the ring gear 46 to rotate which in turn causes the tube 48 to rotate with the ring gear.

A compression spring 50 is disposed in the tube 48. Preferably the spring 50 is attached to the closed end 52 of the tube. Alternatively, if the end 52 of the tube is open, the spring 50 may contact or be connected to the closed end of the barrel. The spring is compressed by the introduction of wire connectors 54 from the front opening 56 of the reservoir tube. The spring biases the connectors toward the opening 56. A retention spring at the front of the tube prevents unwanted, premature release of the connectors from the tube.

The rotating action of the reservoir tube 48 can be imparted to the wire connectors 54 in a number of ways. In the embodiment shown in FIG. 3, the inner surface 55 of the front opening 56 of the reservoir tube 48 includes opposing slots 58 which accept the wings 60 of a wire connector 54. In the embodiment shown in FIG. 2, the front opening 56 of the reservoir tube 48 includes at least one protruding member 62 which extends radially inwardly to engage a surface of the wing 60. The embodiment shown in FIG. 2 is preferred since the wings of the wire connector do not have to be aligned with the slots during loading of a clip of connectors into the reservoir tube 48.

FIG. 1 shows a retaining mechanism 64 attached to the front of the reservoir tube to restrain the ejecting force on the wire connectors created by the spring 50. This mechanism includes a spring retained in a slot in the front cap of the barrel. However, once the foremost wire connector has been twisted on to the stripped ends of the wires and the device is pulled away from the just terminated wires, the restraining action of the spring is overcome, allowing the wire connector to exit the tube. This pulling away adds enough force to the urging force of the compression spring 50 so that the retaining mechanism can no longer hold the wire connector, which is thereby released from the reservoir tube and front cap.

The wire connectors can be inserted one by one through the opening of the retention mechanism and into the reservoir tube. If the reservoir tube is closed at end 52, the wire connectors will be housed and stored in the reservoir tube. However, if the reservoir tube is open at end 52, the wire connectors inserted into the tube may pass through the tube and be housed and stored in the elongated barrel 14. In either case, it would be more efficient and desirable to be able to load, feed or insert a group or clip of wire connectors in one motion. In another aspect, the invention is directed to interlocking wire connectors designed for this purpose.

Figure 6:
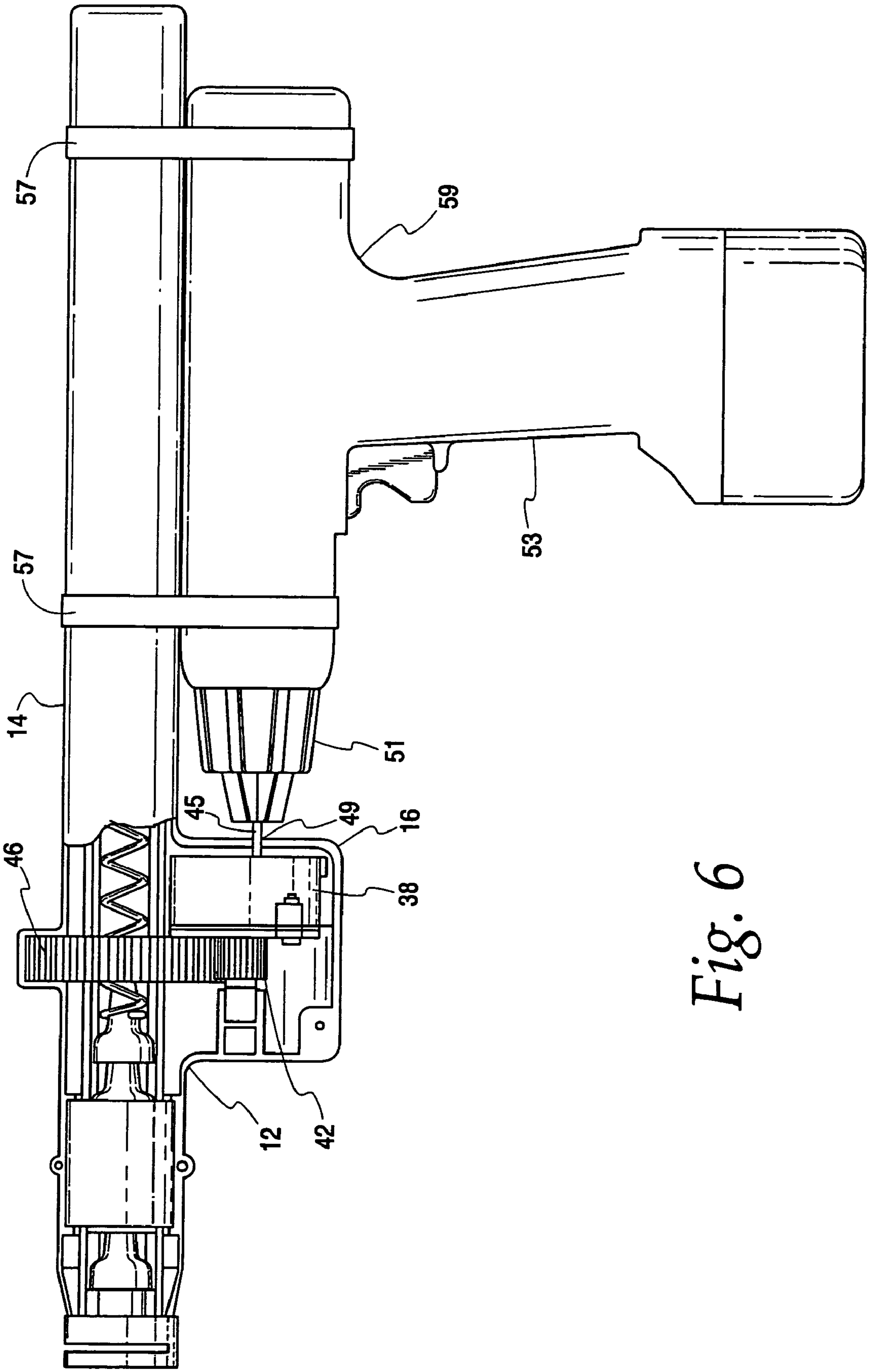
FIG. 6 is a side elevation view of an alternative embodiment of the wire applicator of the present invention shown attached to a cordless drill and having part of the housing removed to expose the gear assembly.

FIG. 6 illustrates an alternate embodiment of the present invention wherein the drive motor and its associated battery and controls are deleted. In FIG. 6, an input shaft 45 extends from the planetary gear assembly 38 and through an opening 49 in the case 16. The input shaft 45 may be engaged by a standard chuck 51 of a cordless electric drill 53. The housing 12 includes anti-rotation straps or restraints 57 which are releasably connected to the drill housing 59 to prevent the housing 12 from rotating with the drill's chuck 51. The anti-rotation straps may include a buckle or a standard Velcro cinch strap for adjusting and tightening the strap. The cordless drill 53 is used to cause rotation of the planetary gear assembly's input shaft 45, which in turn causes the pinion 42 and ring gear 46 to rotate, thereby rotating the reservoir tube. This embodiment provides a more economical tool which takes advantage of the fact that it is common for tradespeople to carry their own general purpose cordless electric drill with its own rechargeable battery pack.

Figure 4:
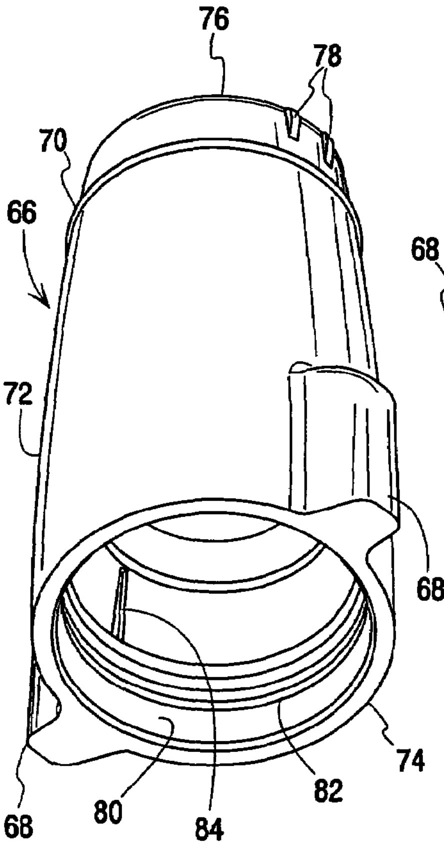
FIG. 4 is a perspective view of a preferred embodiment of a wire connector of the present invention.
Figure 5:
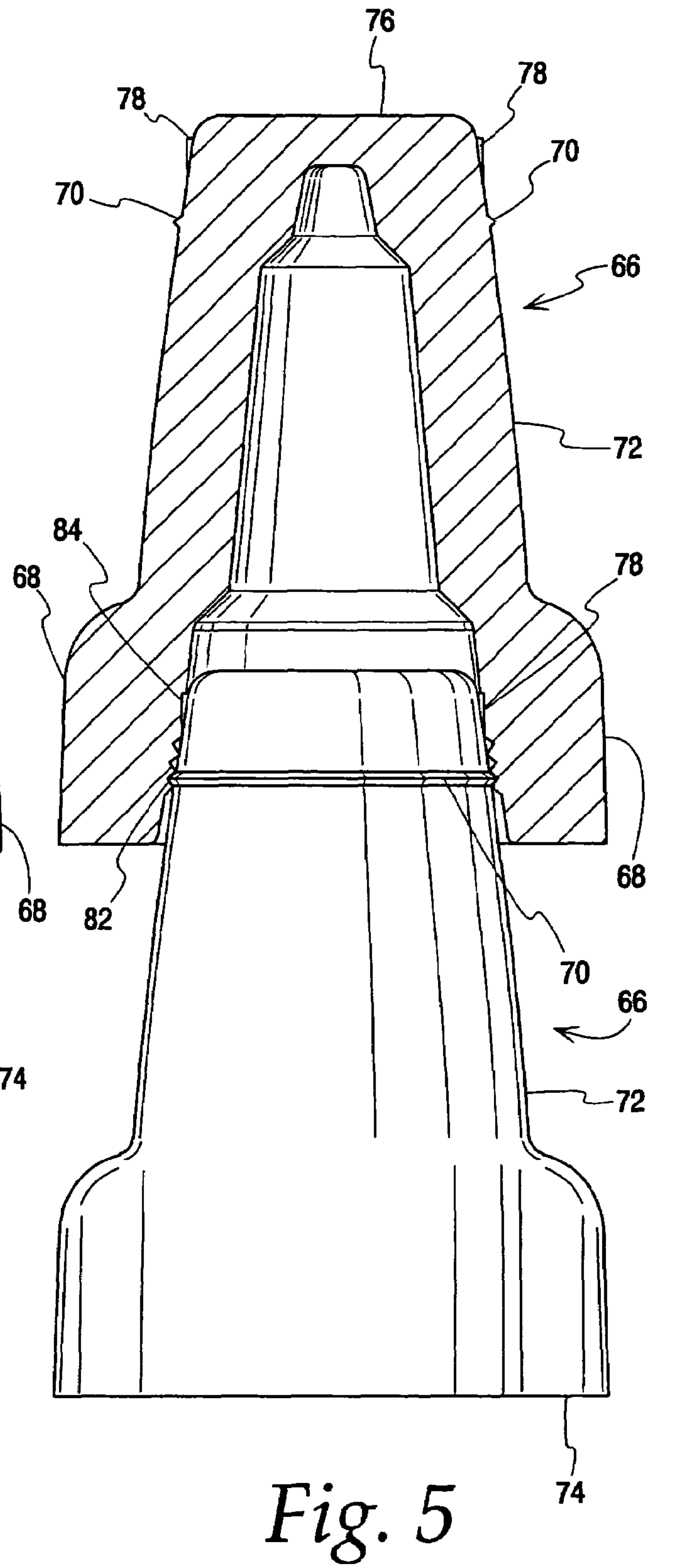
FIG. 5 is a side elevation view of a pair of interlocked wire connectors of the present invention with the uppermost wire connector shown in section.

FIGS. 4 and 5 show one embodiment of an interlocking wire connector 66. The interlocking wire connector 66 includes opposing wings 68 and a circumferential rib 70, both of which extend radially outwardly from the outer surface of the shell 72. Preferably, the wings 68 are adjacent the open end 74 of the wire connector and at least one rib 70 is near the closed end 76 of the wire connector. Also on the outer surface of the shell 72 is at least one projecting member 78. The projecting member also extends radially outwardly from the outer surface, preferably extending as far as the rib 70. In addition, the projecting member preferably is positioned adjacent the rib and closer to the closed end of the connector than the rib.

The inner surface 80 of the shell includes at least one groove 82. The groove preferably circumscribes the inner surface and is near the open end of the connector. The circumferential groove 82 is adapted to engage the rib 70 of a similarly configured wire connector. The inner surface 80 also includes at least one axially-extending slot 84 preferably near the groove and closer to the closed end of the connector than the groove.

The projecting member 78 is adapted to engage the slot 84 and the rib 70 is adapted to engage the groove 82 of a similarly configured wire connector. Preferably, the projecting member, rib, groove and slot are aligned circumferentially at the same position as the wings to facilitate the interlocking of the wire connectors. The wire connectors can be detachably interlocked by forcing the closed end of one connector into the open end of a similarly configured wire connector until the rib and projecting member mate with groove and slot respectively. An interference fit is created between the rib and groove and the projecting member and the slot.

This fit or engagement of rib and groove and projecting member and slot prevents the interlocked wire connectors from being axially separated before the desired time. The fit between the projecting member and the slot also prevents relative rotation between the interlocked wire connectors. In other words, the engagement of the projection member and slot forces the clip to rotate as a single unit. This feature prevents unnecessary friction and wearing of the wire connecters among other things.

The operation of the wire connector applicator and the detachably interlocking wire connectors of the present invention is as follows. The wire connectors can be interlocked by the user by first aligning the wings of two wire connectors and then pushing the closed end of one into the opening of the other until the rib snaps into the groove and the projecting member snaps into the slot. Preferably a plurality of wire connectors is provided in an interlocked condition. This may alternately be done at the factory so a fully formed clip is supplied to the user.

The clip of interlocked wire connecters is positioned so that either the wings 60 are aligned with slots 58 of the reservoir tube or aligned to avoid contacting the protruding member 62, depending on the configuration of the reservoir tube. The wire connector with an exposed closed end is first inserted into the reservoir tube. The spring 50 is compressed as the clip is pushed into the reservoir tube 48. The open end of the last wire connector of the clip to enter the reservoir tube is pushed past the retaining spring which contacts the shell of this last wire connector of the clip and prevents the spring 50 from pushing the clip back out of the reservoir tube.

The number of wire connectors that can be loaded into the application depends on the size of the connectors and the length of the reservoir tube or the barrel. These can be chosen to fit a particular application. Preferably, the reservoir tube can hold ten interlocked wire connectors. Once the reservoir tube has been loaded with a clip of wire connectors, the process of applying the wire connectors to the exposed ends of electrical wire can proceed quickly. The stripped wires are inserted past the opening of the retaining mechanism and into the open end of the outermost wire connecter. The wires can be brought to the applicator, or vice versa, to effect this insertion. The openings of the wire connectors are coaxially aligned with the opening of the reservoir tube and retention mechanism. Once the stripped wires contact the inside surface of the shell and can be inserted no further, the trigger 26 is depressed to activate the electric motor which causes the planetary gear assembly 38, the shaft 40, the pinion 42, the ring gear 46 and the reservoir tube 48 to rotate. As the tube rotates, the protruding member 62 or slots contact the wing or wings of the outmost wire connector causing the entire clip of connectors to rotate. This rotation fixes the outermost connector on the electrical wires. After the outermost connector has been applied to the wires, the applicator is pulled away from the terminated wires, releasing the applied connector from the reservoir tube and remaining wire connectors. As the outermost wire connector exits the tube, the spring 50 urges the clip forward so that the next wire connecter contacts the retaining mechanism preventing the clip from exiting the tube. The next connector can then be applied in a similar manner.

The invention claimed is:

1. An applicator for installing twist-on wire connectors, comprising:

- a housing having an opening;
- a hollow tube mounted for rotation within the housing, the tube being adapted to store a plurality of wire connectors therein, the tube defining an opening through which stored wire connectors are dischargeable, the tube opening being adjacent to and aligned with the opening within the housing, the tube further including an inner surface engageable with a wire connector in the tube so that the wire connector rotates with the tube;
- a biasing element positioned within the hollow tube, the biasing element engageable with the stored wire connectors to bias them toward the opening of the tube; and
- a gear assembly mounted in the housing and operatively connected to the tube to rotatably drive the tube.

2. The applicator of claim 1 wherein the tube has an elongated, cylindrical shape.

3. The applicator of claim 1 wherein the inner surface of the tube comprises at least one protruding member engageable with a wing of the wire connector adjacent the opening of the tube.

4. The applicator of claim 1 wherein the inner surface of the tube comprises at least one slot engageable with a wing of the wire connector adjacent the opening of the tube.

5. The applicator of claim 1 further including a motor within the housing, the motor being engageable with the gear assembly for driving the gear assembly.

6. The applicator of claim 5 further including a power source associated with the housing for supplying power to the motor, and a switch connected between the power source and the motor.

7. The applicator of claim 6 further including a variable speed controller connected in circuit between the switch and the motor.

8. The applicator of claim 6 wherein the power source comprises a rechargeable battery.

9. The applicator of claim 1 wherein the housing further includes a handle.

10. The applicator of claim 1 wherein the gear assembly further includes an input shaft engageable with a chuck of a drill so that the drill drives the gear assembly.

11. The applicator of claim 10 further including an anti-rotation restraint which releasably connects the drill and housing.

12. The applicator of claim 1 wherein the opening of the housing and the opening of the tube are adapted to receive a wire connector to be stored within the tube.

13. The applicator of claim 1 wherein the gear assembly comprises a planetary gear train, a pinion driven by the planetary gear train, and a ring gear connected to the tube and driven by the pinion.

14. The applicator of claim 1 further comprising a retainer attached to the tube near the opening of the tube, the retainer being adapted to prevent premature release of the wire connector adjacent the opening of the tube.

15. The applicator of claim 1 wherein the applicator is a portable handheld device.

16. A twist-on wire connector applicator, comprising:

a housing defining an opening and including an elongated barrel configured to store a plurality of wire connectors;

a hollow tube mounted for rotation within the housing, the tube defining a rear opening for receiving a stored wire connector and a front opening adjacent to and generally aligned with the opening of the housing, the front opening being adapted to discharge the stored wire connectors, the tube further including an inner surface engageable with a wire connector adjacent the front opening so that a wire connector in the tube rotates with the tube;

a biasing member positioned in the hollow tube for biasing the plurality of connectors toward the front opening; and a gear assembly mounted in the housing and operatively connected to the tube to rotatably drive the tube.

17. The applicator of claim 16 wherein the opening of the housing and the front opening of the tube are adapted to receive a wire connector for storage.

18. The applicator of claim 16 further comprising a motor within the housing for driving the gear assembly.

19. The applicator of claim 16 wherein the gear assembly includes an input shaft engageable with a chuck of a drill so that the drill drives the gear assembly.

20. The applicator of claim 16 wherein the applicator is a portable handheld device.

21. A twist-on wire connector applicator, comprising;

a housing having an opening;

a hollow elongated tube mounted for rotation within the housing, the tube adapted to store a plurality of wire connectors therein, the tube defining an opening for discharging stored wire connectors, the tube opening being adjacent to and aligned with the opening of the housing;

a biasing element located within the tube for biasing stored wire connectors towards the opening of the tube;

a retainer attached to the tube near the opening of the tube such that the retainer will prevent wire connectors from prematurely exiting the tube;

the tube having an inner surface engageable with a wire connector adjacent to the opening of the tube;

a motor mounted in the housing and operatively connected to the tube for rotating the tube;

a power supply associated with the housing which supplies power to the motor; and a switch connected between the power supply and the motor.

22. The applicator of claim 21 wherein the tube is generally cylindrical.

23. The applicator of claim 21 wherein the wire connector has at least one wing and the inner surface of the tube comprises at least one protruding member engageble with a wing of the wire connector adjacent the opening of the tube.

24. The applicator of claim 21 wherein the wire connector has at least one wing and the inner surface of the tube comprises at least one slot engageble with a wing of the wire connector adjacent the opening of the tube.

25. The applicator of claim 21 further comprising a handle attached to the housing and a trigger in the handle which activates the switch when pressed by a user.

26. The applicator of claim 21 wherein the opening in the housing and the opening of the tube are adapted to receive a wire connector for storage within the tube.

27. The applicator of claim 21 wherein the power supply is a rechargeable battery.

28. The applicator of claim 21 wherein the biasing element is a spring.

29. The applicator of claim 21 wherein the applicator is a portable handheld device.

* * * * *